(12) United States Patent
Zeng et al.

(10) Patent No.: US 11,989,947 B2
(45) Date of Patent: May 21, 2024

(54) PERCEPTION SYSTEM WITH ATTENTION MODULE FOR PROCESSING VISUAL DATA

(71) Applicant: GM GLOBAL TECHNOLOGY OPERATIONS LLC, Detroit, MI (US)

(72) Inventors: Shuqing Zeng, Sterling Heights, MI (US); Jordan B. Chipka, Commerce Township, MI (US); Thanura R. Elvitigala, Frisco, TX (US)

(73) Assignee: GM Global Technology Operations LLC, Detroit, MI (US)

( * ) Notice: Subject to any disclaimer, the term of this patent is extended or adjusted under 35 U.S.C. 154(b) by 504 days.

(21) Appl. No.: 17/367,847

(22) Filed: Jul. 6, 2021

(65) Prior Publication Data
US 2023/0010239 A1 Jan. 12, 2023

(51) Int. Cl.
| | |
|---|---|
| *G06V 20/58* | (2022.01) |
| *B60R 11/04* | (2006.01) |
| *G06N 3/08* | (2023.01) |
| *G06T 3/40* | (2006.01) |
| *G06V 10/25* | (2022.01) |

(52) U.S. Cl.
CPC ............. *G06V 20/58* (2022.01); *B60R 11/04* (2013.01); *G06N 3/08* (2013.01); *G06T 3/40* (2013.01); *G06V 10/25* (2022.01)

(58) Field of Classification Search
CPC ........ G06V 20/58; G06V 10/25; G06V 10/24; G06V 10/454; G06V 10/82; G06V 20/56; G06V 10/40; B60R 11/04; G06N 3/08; G06N 3/0464; G06N 3/092; G06T 3/40; G06T 3/4046
See application file for complete search history.

(56) References Cited

U.S. PATENT DOCUMENTS

2022/0358695 A1* 11/2022 Doliwa .................... G06N 5/04

OTHER PUBLICATIONS

Růžička V, Franchetti F. Fast and accurate object detection in high resolution 4K and 8K video using GPUs. In2018 IEEE High Performance extreme Computing Conference (HPEC) Sep. 25, 2018 (pp. 1-7). IEEE. (Year: 2018).*

(Continued)

*Primary Examiner* — Fayyaz Alam
(74) *Attorney, Agent, or Firm* — Quinn IP Law

(57) ABSTRACT

A perception system is adapted to receive visual data from a camera and includes a controller having a processor and tangible, non-transitory memory on which instructions are recorded. A subsampling module, an object detection module and an attention module are each selectively executable by the controller. The controller is configured to sample an input image from the visual data to generate a rescaled whole image frame, via the subsampling module. The controller is configured to extract feature data from the rescaled whole image frame, via the object detection module. A region of interest in the rescaled whole image frame is identified, based on an output of the attention module. The controller is configured to generate a first image based on the rescaled whole image frame and a second image based on the region of interest, the second image having a higher resolution than the first image.

19 Claims, 3 Drawing Sheets

(56) References Cited

OTHER PUBLICATIONS

Zhai Y, Shah M. Visual attention detection in video sequences using spatiotemporal cues. InProceedings of the 14th ACM international conference on Multimedia Oct. 23, 2006 (pp. 815-824). (Year: 2006).*

Chen LC, Yang Y, Wang J, Xu W, Yuille AL. Attention to scale: Scale-aware semantic image segmentation. InProceedings of the IEEE conference on computer vision and pattern recognition 2016 (pp. 3640-3649). (Year: 2016).*

Fast and accurate object detection (Year: 2018).*

\* cited by examiner

PERCEPTION SYSTEM WITH ATTENTION MODULE FOR PROCESSING VISUAL DATA

INTRODUCTION

The present disclosure relates generally to a perception system for visual data. More specifically, the disclosure relates to a perception system having an attention module and an object detection module for processing visual data. Automatic object detection methods are useful in many different settings, including robotics, navigation systems of autonomous vehicles, surveillance devices, and automated personal assistance devices. The challenges faced by an automatic object detection system include coping with variation within an object category and with diversity of visual imagery caused by lighting, surrounding scenery, and the orientation of an object. In addition to the complexity of the visual data, another significant challenge is the amount of computing resources required to process the images, particularly for applications that require high-definition sensing.

SUMMARY

Disclosed herein is a perception system for a camera. The perception system includes a controller having a processor and tangible, non-transitory memory on which instructions are recorded. A subsampling module, an object detection module and an attention module are each selectively executable by the controller. Execution of the instructions by the processor causes the controller to sample an input image from the visual data to generate a rescaled whole image frame, via the subsampling module. The controller is configured to extract feature data from the rescaled whole image frame, via the object detection module. A region of interest in the rescaled whole image frame is identified, based on an output of the attention module. The controller is configured to generate a first image based on the rescaled whole image frame and a second image based on the region of interest, the second image having a higher resolution than the first image.

In some embodiments, the camera is affixed to a vehicle and the controller is configured to control an operation of the vehicle based in part on the first image and/or the second image. The object detection module may include a first backbone unit and a second backbone unit. The first backbone unit and the second backbone unit are adapted to extract the feature data from the input image and the region of interest, respectively. In some embodiments, the controller is adapted to generate the second image based on multiple episodic frames over time, each of the multiple episodic frames incorporating the feature data from an immediately prior one of the multiple episodic frames.

The region of interest defines a center. The controller may be adapted to select the center from an area of potential centers based on the output of the attention module. In some embodiments, the output of the attention module includes an attention agent indicating a respective probability of a positive reward corresponding to each potential center within the area of potential centers. In other embodiments, the output of the attention module includes an attention agent indicating a respective predicted reward corresponding to each potential center within the area of potential centers.

The attention module may include a deep Q-value network trained to identify the region of interest. Training the deep Q-value network includes maximizing a reward. The reward may be obtained by comparing a first number of true positives obtained from a ground truth data set, with a second number of true positives obtained from a raw data set. Training the deep Q-value network may include obtaining a respective loss as a difference between the reward and a predicted reward corresponding with each potential center within the area of potential centers and minimizing the respective loss.

Disclosed herein is a method of operating a perception system having a camera collecting visual data and a controller with a processor and tangible, non-transitory memory. The method includes transferring the visual data from the camera to the controller. The controller is adapted to selectively execute a subsampling module, an object detection module and an attention module. The method includes sampling an input image from the visual data to generate a rescaled whole image frame, via the subsampling module, and extracting feature data from the rescaled whole image frame, via the object detection module. A region of interest is identified in the rescaled whole image frame based on an output of the attention module. The method includes generating a first image based on the rescaled whole image frame and a second image based on the region of interest, the second image having a higher resolution than the first image.

Also disclosed herein is a vehicle having a camera adapted to obtain visual data and a controller adapted to receive the visual data from the camera, the controller having a processor and tangible, non-transitory memory on which instructions are recorded. The controller is configured to sample an input image from the visual data to generate a rescaled whole image frame, via the subsampling module. The controller is configured to extract feature data from the rescaled whole image frame, via the object detection module. A region of interest in the rescaled whole image frame is identified, based on an output of the attention module. The controller is configured to generate a first image based on the rescaled whole image frame and a second image based on the region of interest, the second image having a higher resolution than the first image.

The above features and advantages and other features and advantages of the present disclosure are readily apparent from the following detailed description of the best modes for carrying out the disclosure when taken in connection with the accompanying drawings.

Figure 1:
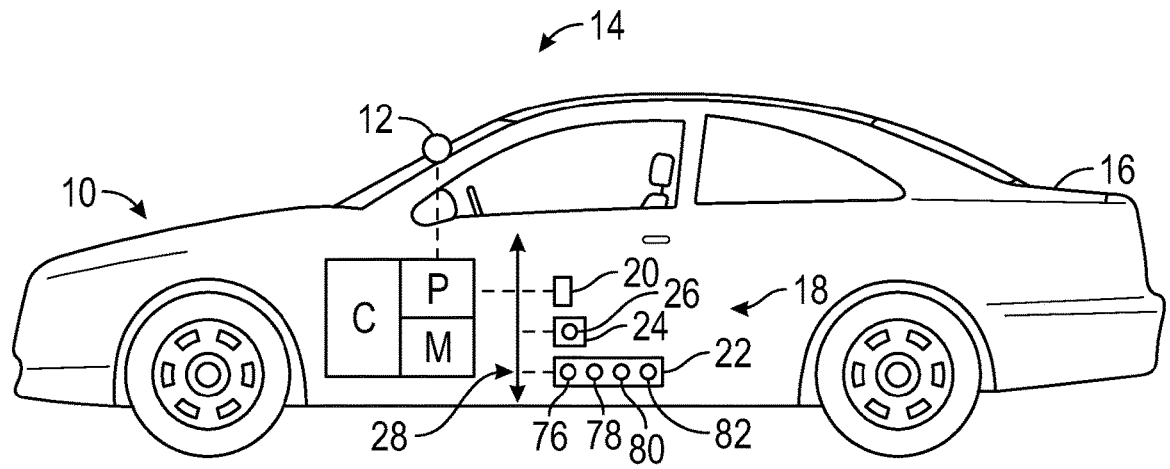
FIG. 1 is a schematic fragmentary diagram of a perception system having a camera and a controller.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a perception system 10 having a camera 12. The camera 12 is rigidly affixed, connected or attached (directly or indirectly) to a platform 14. The platform 14 may be a non-mobile platform, such as a building structure, a desktop computing device or factory equipment. The platform 14 may be a mobile platform, such as a vehicle 16. The vehicle 16 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, airplane, and train. It is to be understood that the vehicle 16 may take many different forms and have additional components.

Referring to FIG. 1, the perception system 10 includes a controller C having at least one processor P and at least one memory M (or non-transitory, tangible computer readable storage medium) on which instructions are recorded for executing a method 100, described in detail below with respect to FIG. 3. The memory M can store controller-executable instruction sets, and the processor P can execute the controller-executable instruction sets stored in the memory M.

Referring to FIG. 1, the perception system 10 includes a plurality of modules 18 selectively executable by the controller C. The plurality of modules 18 includes a subsampling module 20, an object detection module 22 and an attention module 24. The perception system 10 reduces the number of pixels required to process the visual data obtained by the camera 12, for example, by employing lower resolution (e.g., standard definition) for peripheral areas and by employing higher resolution (e.g., high definition) to cover selected areas of interest. The object detection module 22 may be employed to identify and track objects in a scene. For example, tracking the objects may include drawing a bounding box around each object of interest in the image and assigning them a class label. The object detection module 22 may include a region-based convolutional neural network (R-CNN).

The subsampling module 20 utilizes an attention agent generated by the attention module 24 to extract information regarding the usefulness or importance of each part of the visual data obtained by the camera 12. The attention agent may be in the form of a matrix or other data repository. The attention module 24 is based on reinforcement learning and is adapted to identify one or more regions of interest, e.g., by incorporating a deep Q-value network 26. In one example where the platform 14 is a ground vehicle, the attention module 24 may be trained/rewarded to find an area with small vehicles and select the region of interest to cover that area. In another example where the platform 14 is an airplane, the attention module 24 may be trained to direct the region of interest to cover the presence of birds.

The controller C of FIG. 1 may be an integral portion of, or a separate module operatively connected to, other controllers of the vehicle 16. For example, the controller C may be an electronic control unit (ECU) of the vehicle 16. In some embodiments, the controller C may be an integrated control unit embedded within the camera 12. The controller C may receive input from other sensors (not shown) operatively connected to the platform 14.

Referring to FIG. 1, the various components of the perception system 10 may be in communication with the controller C (and each other) via a wireless network 28, which may be a short-range network or a long-range network. The wireless network 28 may be a communication BUS, which may be in the form of a serial Controller Area Network (CAN-BUS). The wireless network 28 may incorporate a Bluetooth connection, a Wireless Local Area Network (LAN) which links multiple devices using a wireless distribution method, a Wireless Metropolitan Area Network (MAN) which connects several wireless LANs or a Wireless Wide Area Network (WAN). Other types of connections may be employed.

Figure 2:
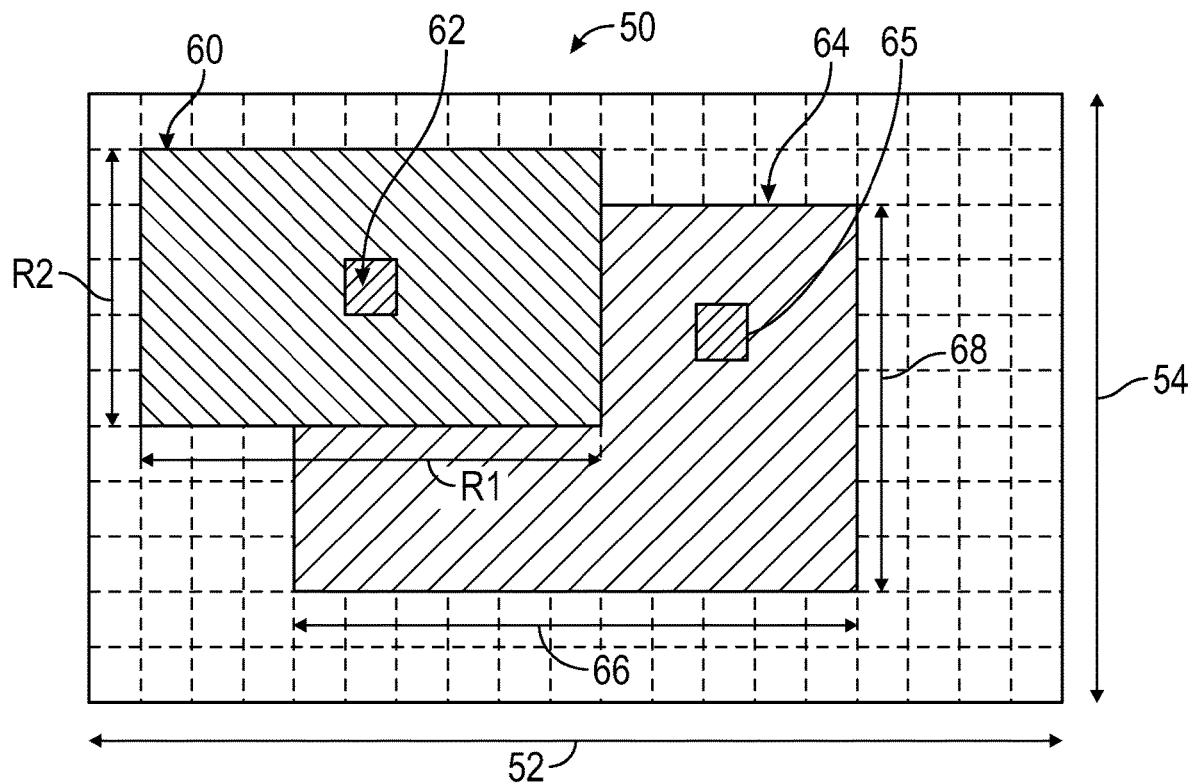
FIG. 2 is a schematic example of a field of view of the camera of FIG. 1, discretized to a grid.

The camera 12 of FIG. 1 is adapted to obtain visualization information, referred to herein as visual data, and may incorporate various types of optical sensors and photodetectors available to those skilled in the art. The camera 12 may be a stereoscopic camera adapted to obtain left and right image pairs. FIG. 2 illustrates an example field of view 50 of the camera 12. The field of view 50 is shown discretized to a grid with a horizontal span 52 and a vertical span 54. In a non-limiting example, the horizontal span 52 and the vertical span 54 of the field of view 50 is 1280 pixels and 720 pixels, respectively.

The perception system 10 uses the visual data from the camera 12 (and the plurality of modules 18) to generate human-like attention signals to provide high-definition imagery in a selected region, referred to herein as region of interest 60 (see FIG. 2), in the field-of-view 50 of the visual data. Generating a high-resolution image from processing a high-definition (HD) video stream requires substantial computing resources. The perception system 10 (via execution of the method 100) generates a high-resolution image of the region of interest 60, without degrading performance and with a reduced number of image pixels being processed. This enables the perception system 10 to better fit on an embedded platform and increases the utilization of multiple high-definition sensors. The perception system 10 is efficient in terms of computing and memory requirements and is self-contained, as it is derived from perception, with no prior map information being required.

Referring to FIG. 2, an example region of interest 60 is shown. In the example shown, a horizontal grid span R1 of the region of interest 60 is 9 grid units and a vertical grid span R2 of the region of interest 60 is 5 grid units. The region of interest 60 defines a center 62. The center 62 is selected from a set or area 64 of potential centers 65. Referring to FIG. 2, the area 64 defines a first dimension 66 and a second dimension 68, which defines the boundaries within which the potential centers 65 may lie. The area 64 represents a subgroup of the grid representing the field of view 50 that could potentially act as the center 62 of the region of interest 60, based on the location and dimensions of the region of interest 60. In other words, the area 64 is selected such that the region of interest 60 (centered at one of the potential centers 65) will not fall outside the field of view 50.

Figure 3:
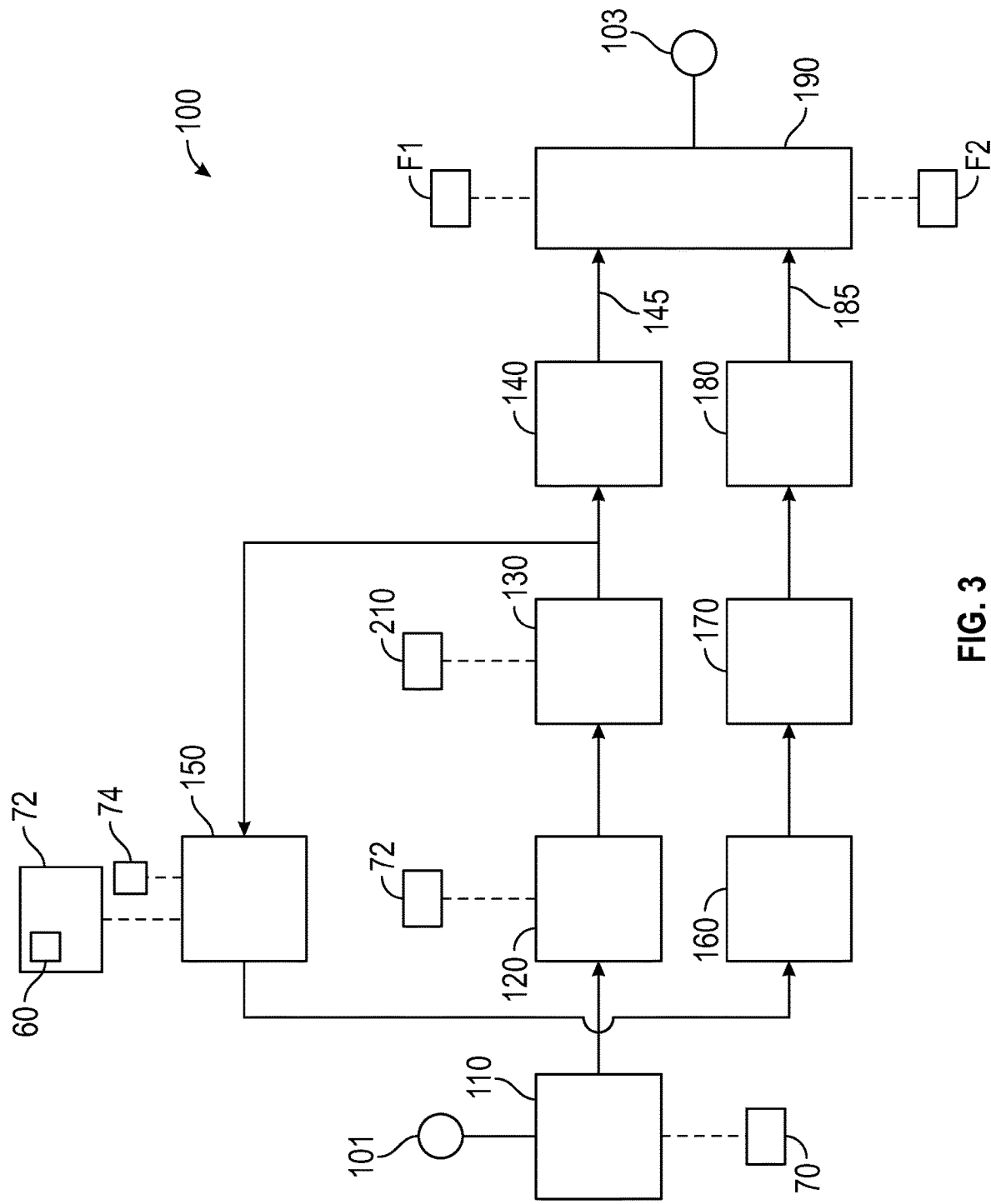
FIG. 3 is a flowchart for a method of operating the perception system of FIG. 1.

Referring now to FIG. 3, a flowchart of the method 100 is shown. Method 100 may be embodied as computer-readable code or instructions stored on and partially executable by the controller C of FIG. 1. Method 100 may be executed in real-time, continuously, systematically, sporadically and/or at regular intervals, for example, each 10 milliseconds during normal and ongoing operation of the vehicle 16. Method 100 of FIG. 3 begins at block 101, ends at block 103 and includes sub-routines or process blocks 110, 120, 130, 140, 150, 160, 170, 180 and 190. Method 100 need not be applied in the specific order recited herein. Furthermore, it is to be understood that some blocks may be eliminated.

Per block 110 of FIG. 3, the controller C is programmed to receive visual data from the camera 12, including an input image 70. The visual data may be still images or a video stream. Proceeding to block 120, the controller C is adapted to sample the input image 70 to generate a rescaled whole image frame 72, via the subsampling module 20. Subsampling is a method that reduces data size by selecting a subgroup of the original data. Attention sampling speeds up the processing of large inputs by processing a fraction of the input image data in high resolution.

Advancing to block 130 of FIG. 3, the controller C is programmed to extract feature data from the rescaled whole image frame 72 (obtained in block 120), via the object detection module 22. The feature data may be held, stored, or represented by a feature tensor 210 (see FIGS. 3-4). A tensor is a vector or matrix of n-dimensions that represents different types of data. The values in a tensor may hold identical data type particular shape that defines the dimensionality of the matrix or array. In some embodiments, the object detection module 22 incorporates a Convolutional Neural Network (CNN). Referring to FIG. 1, the object detection module 22 may include first backbone unit 76, a first object detection head 78, a second backbone unit 80 and a second object detection head 82. The first backbone unit 76 is adapted to extract feature maps from the input image 70, which may be up sampled by decoder models to generate segmented masks.

Figure 4:
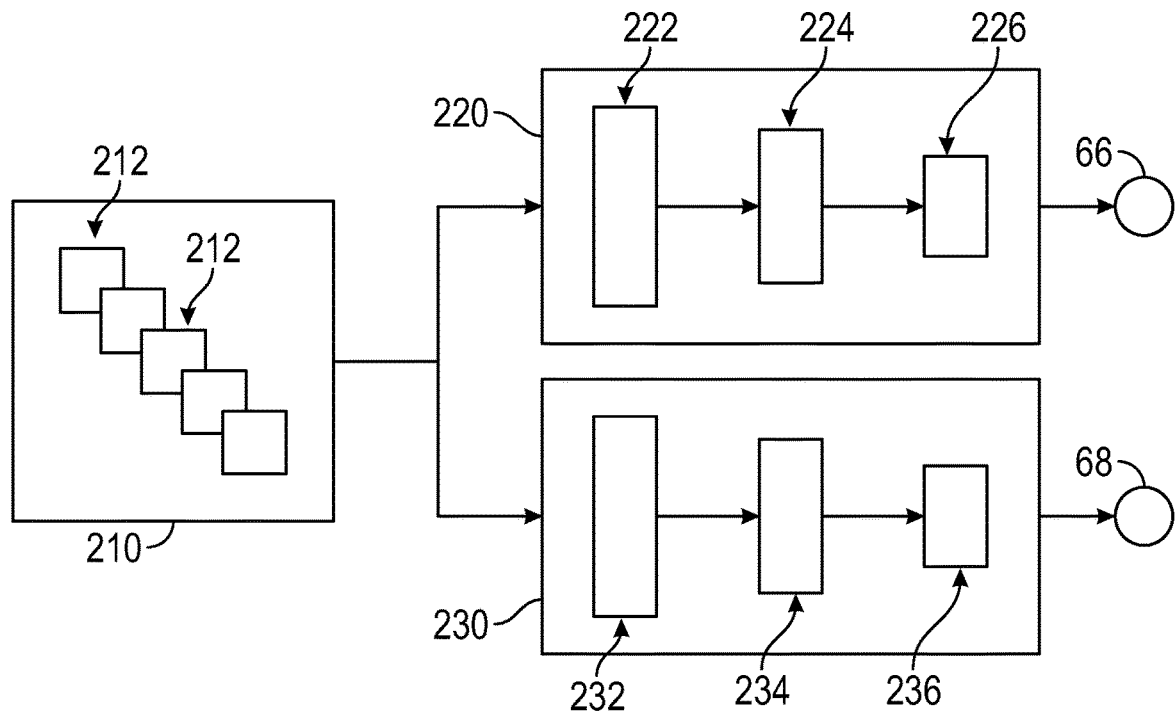
FIG. 4 is a schematic diagram illustrating a portion of the method of FIG. 3.

The method 100 may proceed from block 130 simultaneously to block 140 and block 150. Per block 140 of FIG. 3, the output of the first backbone unit 76 (e.g., feature tensor 210) is transferred to the first object detection head 78. Per block 150 of FIG. 3, the output of the first backbone unit 76 (e.g., feature tensor 210) is transferred to the attention module 24. Referring to FIG. 4, the feature tensor 210 includes a plurality of voxels 212 or three-dimensional data that is "flattened" and fed into a first neural network 220 and a second neural network 230 of the attention module 24.

Referring to FIG. 4, the first neural network 220 includes an input layer 222, at least one hidden layer 224 and an output layer 226. The second neural network 230 includes an input layer 232, at least one hidden layer 234 and an output layer 236. Referring to FIG. 4, the first neural network 220 and the second neural network 230 may be adapted to obtain the first dimension 66 and the second dimension 68 of the area 64 (see FIG. 2), respectively. As noted above with respect to FIG. 2, the controller C defines the location of the region of interest 60 within the field of view 50 by selecting the center 62 of the region of interest 60 from among the area 64 of potential centers 65. Also, per block 150 of FIG. 3, the attention module 24 is selectively executed to generate an attention agent 74 and identify at least one region of interest 60 in the rescaled whole image frame 72, based on the attention agent 74. In some embodiments, the attention agent 74 (At) at time t is expressed as: $At^* = \text{argmax } A[Q(At)]$.

Referring to FIG. 1, the attention module 24 may include a deep Q-value network 26 trained to identify the region of interest 60. The deep Q-value network 26 performs a sequence of actions that generates a maximum value of a reward function, referred to as a Q-value. The deep Q-value network 26 predicts the Q-value of the attention agent 74 (At). In some embodiments, the output of the deep Q-value network 26 may be expressed as $[Q(At) = DQN(Xt-1, \theta)]$, where $Xt-1$ is a feature tensor (generated by the object detection module 22) and $\theta$ represents the weights or parameters (obtained in training) of the deep Q-value network 26 (DQN). Stated another way, the deep Q-value network 26 estimates a Q value for each possible action a, based on the weights $\theta$. The result is the attention agent 74, whose size is the same as the unit size of the area 64 (see FIG. 2) of potential centers 65. That is, each action a is the selection of one potential center (in the area 64) as the center 62 of the region of interest 60.

The method 100 of FIG. 3 advances to block 160 from block 150. Based on the attention agent 74 (generated in block 150), the subsampling module 20 generates window frame data for the region of interest 60. The subsampling process may be represented as: Subsample (It, At)=[ROIt, Wt], where ROIt is the image of the selected window or region of interest 60 obtained from an input image It using the attention agent 74 (At), and Wt represents the rescaled whole image frame of the input image It.

The method 100 of FIG. 3 advances to block 170 from block 160. Per block 170 of FIG. 3, the controller C is programmed to selectively execute the object detection module 22 to extract feature data from the window frame data (from block 160). More specifically, the second backbone unit 80 of the object detection module 22 is adapted to extract features from the window frame data. Next, per block 180 of FIG. 3, the extracted features from the window frame data are transferred to the second object detection head 82 within the object detection module 22 for further processing. The method 100 of FIG. 3 advances to block 190.

Per block 190 of FIG. 3, as indicated by line 185, the data from the second object detection head 82 is used to generate a second image F2 based on the region of interest 60. As indicated by line 145, the data from the first object detection head 78 (from block 140) is used to generate a first image F1 based on the rescaled whole image frame 72. The second image F2 has a higher resolution than the first image F1. For example, the first image F1 may be a standard-definition image of the (full) input image 70 and the second image F2 may be a high-definition image of the region of interest 60.

The controller C may be programmed to use the first image F1 and the second image F2 from block 190 to control or affect an operation of the vehicle 16. For example, operations such as adaptive cruise control, automatic braking, lane changing and navigation systems may be altered based on respective analyses of the region of interest 60, the first image F1 and/or the second image F2.

Training the deep Q-value network 26 may include maximizing a reward. In some embodiments, a reward is obtained by comparing a first number of true positives obtained with a ground truth data set with a second number of true positives with a raw data set. The reward may be represented by a Key Performance Indicator (KPI), which is an indication of the amount of progress made toward a measurable goal. For example, the reward may be defined as Rt=KPI[Ot, Gt], where Gt is the "ground truth" for the object detection and Ot is a fusion of the visual data for the region of interest 60 and the whole image frame, e.g., Ot=Fusion[ObjectDetector (ROIt), Object_Detector (Wt)]. The true positives refer to the number of detected objects that match the ground truth. If TPB is the number of true positives before attention and TPA is the number of true positives after attention, the value of the reward (Rt) may be set as follows: (1) if TPA−TPB<0, then Rt=−1; (2) if TPA−TPB=0, then Rt=0; and (3) if TPA−TPB>0, then Rt=1.

Training the deep Q-value network 26 may include obtaining a loss as a difference between an actual reward and a predicted reward provided by the deep Q-value network 26. The loss results from a comparison of the predicted reward (outputted by the deep Q-value network 26) and an actual reward. The larger the difference between the predicted reward and the actual reward, the larger the loss. The training process seeks to minimize the loss in addition to maximizing the reward. As noted above, the deep Q-value network 26 may be configured to output an attention agent 74 (see FIG. 3) indicating a respective predicted reward corresponding with the potential centers 65 in the area 64. In this case, determining the region of interest 60 involves determining which portion of the area 64 is associated with the highest predicted reward, according to the attention agent 74. In some embodiments, the attention agent 74 indicates a respective probability of a positive reward corresponding with each of the potential centers 65. Here, determining the region of interest 60 involves determining which of the potential centers 65 in the area 64 is associated with the highest probability of producing a positive reward. The deep Q-value network 26 may implement additional algorithm layers available to those skilled in the art (e.g., softmax) to obtain the probability of producing a positive reward.

Figure 5:
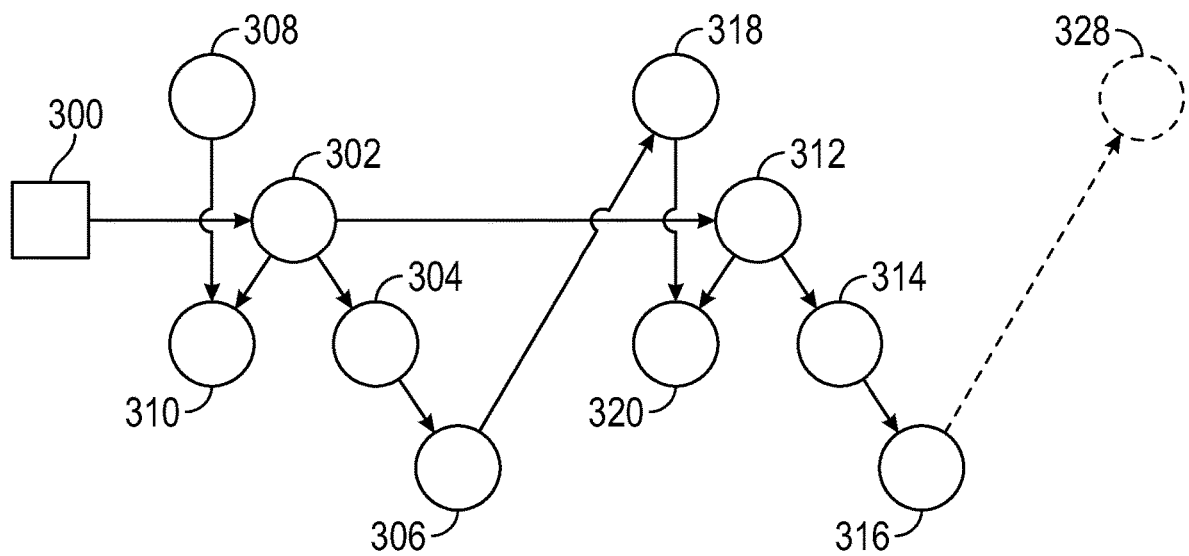
FIG. 5 is a schematic diagram illustrating an example episodic sampling sequence employable by the controller of FIG. 1.

In some embodiments, the controller C is adapted to generate the second image F2 based on multiple episodic frames over time, with each of the multiple episodic frames incorporating the feature data from an immediately prior one of the multiple episodic frames. In other words, the attention agent 74 in each episode t incorporates data from the feature tensor 210 from the previous episode t−1. FIG. 5 is a schematic diagram illustrating an example of episodic sampling employable by the controller C. Referring to FIG. 5, the input image data 300 is fed into a first image matrix 302 ($I_1$), which is utilized to generate a first whole image frame 304 ($I_{SD1}$, standard resolution) and a first feature tensor 306 ($X_1$). Based on input from a first attention agent 308 ($A_1$), the controller C is adapted to use the first image matrix 302 ($I_1$) to generate a first region of interest matrix 310 ($ROI_1$).

As shown in FIG. 5, data from the first feature tensor 306 ($X_1$) and the first image matrix 302 ($I_1$) is utilized to generate a second image matrix 312 ($I_2$), which in turn, generates a second whole image frame 314 ($I_{SD2}$) and a second feature tensor 316 ($X_2$). Based on input from a second attention agent 318 ($A_2$), the controller C is adapted to use the second image matrix 312 ($I_2$) to generate a second region of interest matrix 320 ($ROI_2$). Referring to FIG. 5, data from the second feature tensor 316 ($X_2$) is transferred to the next episode, i.e., the third attention agent 328 ($A_3$). Thus, in each episode t, a past feature tensor ($X_{t-1}$) is retrieved from a replay buffer. In some embodiments, a policy $\pi\theta(At|Xt-1)$ may be sampled with the attention agent 74, and the following is computed: [ROIt, Wt]=Subsample(It, At). Here ROIt is the image of the selected window or region of interest 60 obtained from an input image It using the attention agent At, and Wt represents the rescaled whole image frame of the input image It. The object detection module 22 may be run with both ROIt and Wt, and the key performance indicator may be evaluated as the reward Rt. The parameters ($X_{t-1}$, At, Rt) may be saved to the replay buffer. These steps of sampling are repeated and a target value [y=Rt+argmaxA Q(At)] may be computed. A stochastic gradient descent (SGD) method may be employed to update the loss function.

In summary, the perception system 10 (via execution of the method 100) uses the visual data from the camera 12 (and the plurality of modules 18) to generate human-like attention signals to provide high-definition imagery in the region of interest 60. The perception system 10 resolves the challenge of fitting a perception routine to an embedded platform by applying attention-subsampling strategy, including subsampling the input image resolution without degrading performance. The perception system 10 is self-contained and relatively easy to integrate onto an existing neural network.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a group of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating rechargeable energy storage system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based rechargeable energy storage systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A perception system adapted to receive visual data from a camera, the perception system comprising:
   a controller having a processor and tangible, non-transitory memory on which instructions are recorded;
   a subsampling module, an object detection module and an attention module each selectively executable by the controller;
   wherein execution of the instructions by the processor causes the controller to:
      sample an input image from the visual data to generate a rescaled whole image frame, via the subsampling module;
      extract feature data from the rescaled whole image frame, via the object detection module;
      identify a region of interest in the rescaled whole image frame based at least partially on an output of the attention module;
      generate a first image based on the rescaled whole image frame and a second image based on the region of interest, the second image having a higher resolution than the first image; and
   wherein the region of interest defines a center, the controller being adapted to select the center from an area of potential centers based on the output of the attention module.

2. The perception system of claim 1, wherein:
   the camera is affixed to a vehicle; and
   the controller is configured to control an operation of the vehicle based in part on the second image.

3. The perception system of claim 1, wherein:
   the object detection module includes a first backbone unit and a second backbone unit; and
   the first backbone unit and the second backbone unit are adapted to extract the feature data from the input image and the region of interest, respectively.

4. The perception system of claim 1, wherein:
   the controller is adapted to generate the second image based on multiple episodic frames over time, each of the multiple episodic frames incorporating the feature data from an immediately prior one of the multiple episodic frames.

5. The perception system of claim 1, wherein:
   the output of the attention module includes an attention agent indicating a respective probability of a positive reward corresponding to each potential center within the area of potential centers.

6. The perception system of claim 5, wherein:
   the output of the attention module includes an attention agent indicating a respective predicted reward corresponding to each potential center within the area of potential centers.

7. The perception system of claim 1, wherein:
   the attention module includes a deep Q-value network trained to identify the region of interest, training the deep Q-value network including maximizing a reward.

8. The perception system of claim 7, wherein:
   the reward is obtained by comparing a first number of true positives obtained from a ground truth data set, with a second number of true positives obtained from a raw data set.

9. The perception system of claim 8, wherein:
   training the deep Q-value network includes obtaining a respective loss as a difference between the reward and a predicted reward corresponding with each potential center within the area of potential centers and minimizing the respective loss.

10. A method of operating a perception system having a camera collecting visual data and a controller with a processor and tangible, non-transitory memory, the method comprising:
    transferring the visual data from the camera to the controller, the controller being adapted to selectively execute a subsampling module, an object detection module and an attention module;
    sampling an input image from the visual data to generate a rescaled whole image frame, via the subsampling module;
    extracting feature data from the rescaled whole image frame, via the object detection module;
    identifying a region of interest in the rescaled whole image frame based on an output of the attention module;
    training a deep Q-value network in the attention module to identify the region of interest, training the deep Q-value network including maximizing a reward; and
    generating a first image based on the rescaled whole image frame and a second image based on the region of interest, the second image having a higher resolution than the first image.

11. The method of claim 10, further comprising:
    attaching the camera to a vehicle; and
    controlling an operation of the vehicle based in part on the second image, via the controller.

12. The method of claim 10, further comprising:
    adapting the controller to generate the second image based on multiple episodic frames over time, each of the multiple episodic frames incorporating the feature data from an immediately prior one of the multiple episodic frames.

13. The method of claim 10, further comprising:
obtaining the reward by comparing a first number of true positives obtained from a ground truth data set, with a second number of true positives obtained from a raw data set.

14. The method of claim 10, wherein the region of interest defines a center, further comprising:
selecting the center from an area of potential centers based on the output of the attention module, via the controller.

15. The method of claim 14, further comprising:
generating an attention agent, via the attention module, the attention agent indicating a respective probability of a positive reward corresponding with each potential center within the area of potential centers.

16. The method of claim 14, further comprising:
generating an attention agent, via the attention module, the attention agent indicating a respective predicted reward corresponding with each potential center within the area of potential centers.

17. A vehicle comprising:
a camera adapted to obtain visual data;
a controller adapted to receive the visual data from the camera, the controller having a processor and tangible, non-transitory memory on which instructions are recorded;
a subsampling module, an object detection module and an attention module each selectively executable by the controller;
wherein execution of the instructions by the processor causes the controller to:
sample an input image from the visual data to generate a rescaled whole image frame, via the subsampling module;
extract feature data from the rescaled whole image frame, via the object detection module;
identify a region of interest in the rescaled whole image frame based on an output of the attention module;
generate a second image of the region of interest, the second image having a higher resolution than the input image;
control an operation of the vehicle based in part on the second image; and
wherein the region of interest defines a center, the controller being adapted to select the center from an area of potential centers based on the output of the attention module.

18. The vehicle of claim 17, wherein:
the object detection module includes a first backbone unit and a second backbone unit; and
the first backbone unit and the second backbone unit are adapted to extract the feature data from the input image and the region of interest, respectively.

19. The vehicle of claim 17, wherein the controller is adapted to generate the second image based on multiple episodic frames over time, each of the multiple episodic frames incorporating the feature data from an immediately prior one of the multiple episodic frames.

* * * * *